United States Patent
Tankala et al.

(10) Patent No.: US 6,227,188 B1
(45) Date of Patent: *May 8, 2001

(54) METHOD FOR IMPROVING WEAR RESISTANCE OF ABRASIVE TOOLS

(75) Inventors: Kanishka Tankala, Southbridge, MA (US); Rakesh Kapoor, Suwanee, GA (US)

(73) Assignee: Norton Company, Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/095,891

(22) Filed: Jun. 11, 1998

Related U.S. Application Data

(63) Continuation-in-part of application No. 08/877,382, filed on Jun. 17, 1997, now Pat. No. 5,865,571.

(51) Int. Cl.$^7$ .................................................. B24D 7/00
(52) U.S. Cl. ................................... 125/13.01; 451/548
(58) Field of Search ................................. 125/13.01, 20; 451/548; 175/403, 408

(56) References Cited

U.S. PATENT DOCUMENTS

| | | | |
|---|---|---|---|
| 3,382,743 | * | 5/1968 | Trevathan ............................. 408/144 |
| 4,393,590 | | 7/1983 | Pantzer .................................. 30/387 |
| 4,821,465 | * | 4/1989 | Tomlinson et al. ................. 51/283 R |
| 4,907,663 | * | 3/1990 | Maier ................................... 175/330 |
| 5,069,584 | * | 12/1991 | Obermeier et al. ................... 125/20 |
| 5,125,774 | * | 6/1992 | Catenacci ............................ 408/232 |
| 5,129,919 | | 7/1992 | Kalinowski et al. . |
| 5,387,059 | * | 2/1995 | Borzemsky ........................... 408/226 |
| 5,408,983 | | 4/1995 | Sawluk . |
| 5,411,010 | | 5/1995 | Mummenhoff . |
| 5,454,752 | * | 10/1995 | Sexton et al. ........................ 451/548 |
| 5,611,649 | * | 3/1997 | Matthias ............................... 407/118 |
| 5,649,796 | * | 7/1997 | Durney ................................. 408/211 |
| 5,865,571 | * | 2/1999 | Tankala et al. ...................... 408/1 R |

FOREIGN PATENT DOCUMENTS 3-234474    10/1991    (JP) .

OTHER PUBLICATIONS

Raghu et al., *PTA Proves Its Worth in High–Volume Hardfacing Jobs*, Welding Journa, Feb., 1996, pp.34–40.

Tucker, R.C., Jr., *Thermal Spray Coatings*, ASM Handbook of Surface Engineering vol. 5, 1994, pp. 497–509.

* cited by examiner

*Primary Examiner*—Robert A. Rose
(74) *Attorney, Agent, or Firm*—Sampson & Associates, P.C.

(57) ABSTRACT

A drill bit is provided with a cylindrical body portion fabricated from a plastic material. The body portion is fastened in concentric, end to end relation to a cylindrical cutter fabricated from a metallic material and having an array of cutting elements disposed thereon. The body portion and cutter are preferably tubular, wherein the cutting elements are disposed in an annular array, to facilitate core or crown drilling operations. The wall thickness of the tubular body portion may be increased relative that of the cutter to compensate for wear during drilling. The tubular body portions also may fabricated from a composite polymer including wear resistant particles, whiskers, fibers and the like disposed on inner and outer surfaces of the polymer body, or dispersed throughout the body.

15 Claims, 7 Drawing Sheets

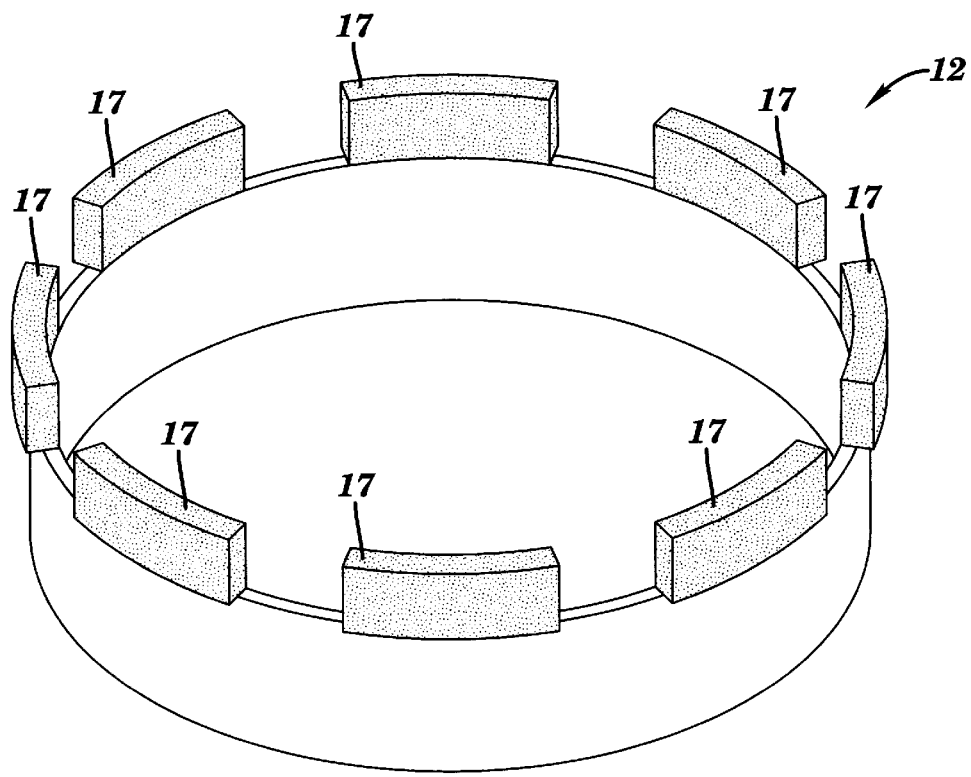
FIG. 5
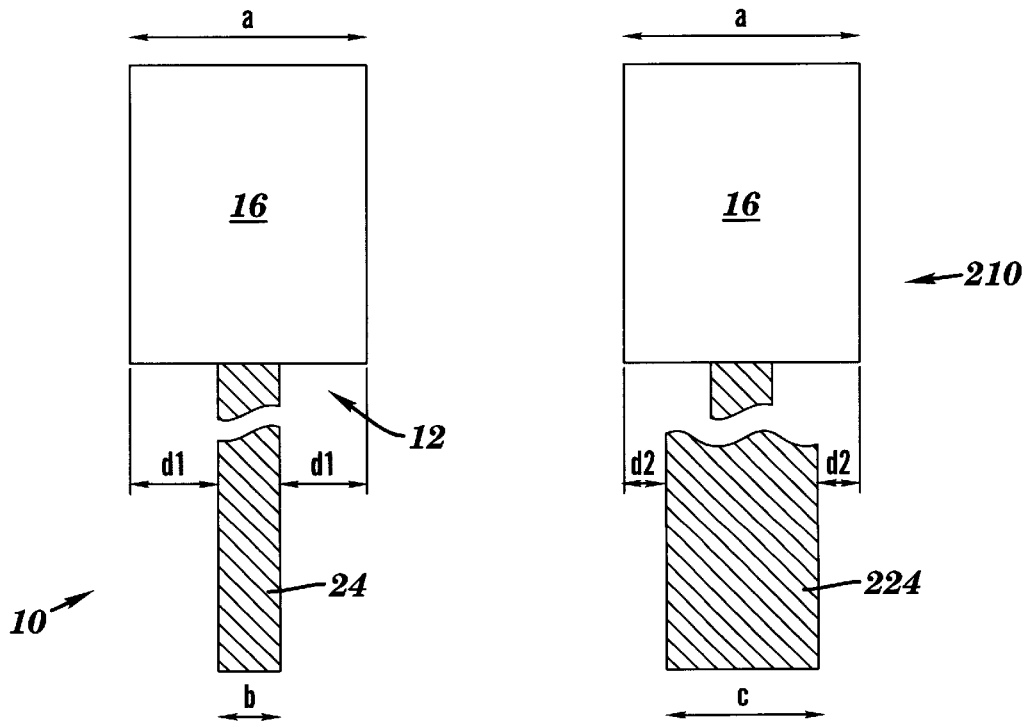
FIG. 6  FIG. 7

METHOD FOR IMPROVING WEAR RESISTANCE OF ABRASIVE TOOLS

This application is a continuation in part of U.S. patent application Ser. No. 08/877,382, filed Jun. 17, 1997 U.S. Pat. No. 5,865,571.

BACKGROUND OF THE INVENTION

1. Field of the Invention

This invention relates to cutting tools and more particularly to use of plastic materials for fabrication of cutting tools adapted to cut circular holes or bores.

2. Background Information

Metallic materials are commonly used to fabricate the main bodies of cutting tools. For example, steel is typically used to fabricate tubes and discs to serve as the main bodies of core bits and circular or disc-shaped saw blades, respectively. Cutting elements, such as abrasive elements or cutting teeth are brazed, laser welded, mechanically fastened to, or formed integrally with, the steel core. Such steel cores operate satisfactorily in a wide range of applications. However, they are not without drawbacks. In particular, metallic cores are relatively heavy, thus tending to make such cutting tools cumbersome and difficult to handle in certain applications. Metallic cores also disadvantageously tend to vibrate and generate noise during cutting operations. Moreover, metallic cores are relatively expensive and comprise a significant portion of the overall cost of the cutting tool.

Some of these problems have been recognized and attempts made to address them with respect to disc-shaped cutting tools. For example, U.S. Pat. Nos. 5,408,983 and 5,411,010 both disclose circular saw blades and/or cutting discs that utilize reinforced plastic composites in the disc-shaped main body portion thereof. These configurations may provide such advantages as reduced tool weight and noise reduction.

Use of similar materials, and the advantages associated therewith, have not, however, been carried over to cylindrical core bit type cutting tools. This is presumably due to the significant distinctions between core bit and circular disc cutting tools and the cutting applications for which they are used. Indeed, it is generally understood by those skilled in the art that these two types of elements operate in distinct cutting regimes, each with a unique set of parameters that are not transferable therebetween. In this regard, data and methodology such as techniques, guidelines and accepted practices in terms of cutting rates, materials and cutting speeds associated with conventional disc-shaped cutting tools are generally inapplicable to cylindrical core bit-type cutting tools.

As an example of these differences, peripheral speeds at which each individual cutting tip or tooth moves through the workpiece, are vastly different. For instance, conventional diamond tipped circular (disc) blades commonly used for cutting hard materials, such as, for example, concrete, typically range from approximately 4 inches (102 mm) to 48 inches (1219 mm) in diameter. Conventional recommended operational speeds in rotations per minute (rpm) for these blades yield a preferred peripheral speed of approximately 49 meters per second (m/s).

On the other hand, diamond segmented core bits commonly utilized for cutting similar material (concrete), range in diameter from approximately 0.4 inches to 10 inches (10 mm to 250 mm) and may be as large as 36 inches (900 mm) or more in some applications. Recommended operational speeds in rpm's yield a recommended peripheral speed of approximately 2.5 m/s. Such a wide discrepancy in peripheral speed, of more than an order of magnitude, is indicative of the non-analogous nature of these two distinct cutting tool types. Similar discrepancies in peripheral speed pertain to other cutting applications or workpiece materials, including, for example, asphalt, stone, reinforced concrete, limestone, silicon quartz, glass, etc.

Another factor that tends to militate against the use of plastic materials in core-bit applications is the relatively abrasive environment encountered by the body of the bit, relative to bodies of circular disc type blades, due to prolonged contact with grinding swarf. In this regard, during each revolution of a conventional disc type blade, an individual tooth or diamond enters the workpiece, removes some of the workpiece to thereby cut a kerf therein, then exits the workpiece. The removed material, along with any cutting lubricant or coolant, forms a relatively abrasive grinding swarf that is effectively carried through the kerf by the tooth and expelled therefrom as the tooth exits the kerf. In this manner, the swarf is effectively removed from the kerf (and from contact with the cutting tool) nominally as fast as the swarf is produced. The abrasive grinding swarf thus tends to contact only the teeth or cutting elements, rather than the relatively abrasion sensitive plastic composite body portion of the disc.

Contrariwise, the nature of core drilling applications requires the cutting teeth or diamonds to remain in the kerf until the cutting operation is complete. Accordingly, during most conventional cutting operations, the swarf, having no other space to occupy, tends to remain in the kerf where it climbs up the tube, carried by cutting liquid, as cutting progresses. Thus, in such cutting applications, the swarf remains in contact with the body of the core bit throughout the cutting operation. The deeper the cut or kerf, the greater the area of contact with the core body. This prolonged contact of the abrasive swarf with the cutting tool presents relatively aggressive working conditions to any components thereof fabricated from relatively soft and abrasion sensitive plastic materials.

Therefore, it is unexpected that a core drill bit made with a plastic core body can be used to cut concrete and other hard materials. It is even more unexpected that such a tool would have a. useful life at least as long as a comparable tool made with a steel core.

SUMMARY OF THE INVENTION

According to one aspect of the invention, a cutting tool adapted to cut a circular hole in a workpiece, includes:

a cutter of substantially cylindrical configuration including an array of cutting elements, the cutter having a cutting end and a coupling end;

a shaft of substantially cylindrical configuration fabricated from a non-metallic material, the shaft having a cutter engagement end and a drill engagement end;

the cutter and the shaft adapted for concentric, end to end engagement with one another wherein the coupling end is substantially rigidly engaged with the cutter engagement end;

the drill engagement end being adapted for operative engagement with a drill for rotation of the cutting tool about the concentric axis.

In a second aspect of the invention, a non-metallic body is provided for a cutting tool adapted to cut a circular hole in a workpiece. The cutting tool has a cutter of substantially cylindrical configuration, including an array of cutting elements, the cutter having a cutting end and an other end. The non-metallic body includes:

a shaft of substantially cylindrical configuration, the shaft having a cutter engagement end and a drill engagement end;

the shaft adapted for concentric, end to end engagement with the cutter wherein the cutter engagement end is substantially rigidly engaged with the coupling end;

the drill engagement end adapted for operative engagement with a drill for rotation of the cutting tool about the concentric axis.

In a third aspect of the invention, a method of drilling a hole in a workpiece includes the steps of:

(a) providing a cutting tool comprising:
 i) a cutter of substantially cylindrical configuration, including an array of cutting elements, the cutter having a cutting end and a coupling end;
 ii) a shaft of substantially cylindrical configuration fabricated from a non-metallic material, the shaft having a cutter engagement end and a drill engagement end; and
 iii) the cutter and the shaft adapted for concentric, end to end engagement with one another wherein the coupling end is substantially rigidly engaged with the cutter engagement end;

(b) fastening the drill engagement end to a drill;

(c) operating the drill to rotate the cutting tool about the concentric axis; and (d) engaging the cutting end with the workpiece.

In a further aspect of the present invention, a method for improving wear resistance of polymer-bodied cutting tools, includes the steps of:

(a) providing a cutting tool having a cutting element disposed on a polymer body; and (b) applying a layer of wear resistant particulate to a surface of the polymer body.

The present invention thus utilizes non-metallic materials in fabrication of cutting tools to obtain advantages such as weight and/or cost reduction relative the prior art.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 5 is a perspective schematic representation of an embodiment of a cutter of a non-metallic body cutting bit of the type shown in FIGS. 1 and 2;

FIG. 6 is a cross-sectional schematic view similar to that of FIG. 1, on an enlarged scale, of a portion of a cutting bit of the type shown in FIG. 1;

FIG. 7 is a view similar to that of FIG. 6, of another embodiment of the present invention;

DETAILED DESCRIPTION OF THE PREFERRED EMBODIMENTS

Figure 1:
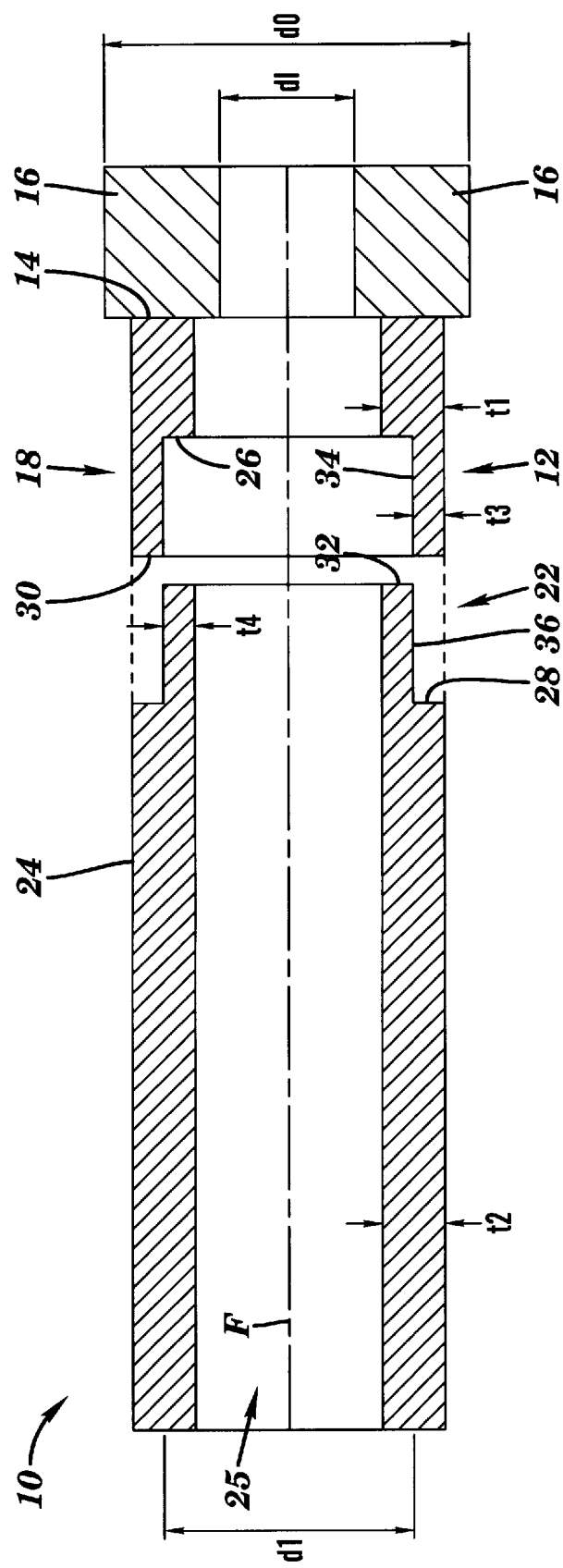
FIG. 1 is a cross-sectional, elevational, exploded schematic view of an embodiment of a non-metallic body cutting bit of the subject invention.

Briefly described, as shown in FIG. 1, the present invention comprises a cylindrical cutting tool or bit 10 for cutting circular holes in a workpiece. Bit 10 is provided with a cylindrical body 24 fabricated from a plastic material. The body portion is fastened in concentric, end to end relation to a cylindrical cutter 12 fabricated from a metallic material and including an array of cutting elements 16 disposed thereon. In a preferred embodiment, bit 10 comprises a core bit, in which body 24 and cutter 12 are substantially tubular, with the cutter including cutting elements disposed in an annular array thereon, to facilitate core or crown drilling operations. As shown in FIG. 7, wall thickness c of tubular body 224 may be increased relative that of cutting element 16 to compensate for wearing of the relatively soft body during drilling. Along these lines, any number of techniques may be utilized to improve wear resistance, such as for example, surface hardening plastic body 224 or increasing the thickness or radial dimension of cutting elements 16 relative to wall thickness c.

Where used in this disclosure, the term "cutting bit" or "bit" shall refer to any cylindrical cutting tool having an array of cutting elements thereon and adapted to rotate for cutting a circular hole in a workpiece, including, for example, conventional core bits, hole or crown saws and solid core drill bits. The term "core bit" shall refer to any drill bit of tubular or hollow construction, including, for example, cutting tools commonly used with conventional core drills, as well as conventional crown saws or hole saws. The term "axial" when used in connection with an element described herein, shall refer to a direction relative to the element, which is substantially parallel to its center of rotation or concentric axis f as shown in FIG. 1. Similarly, the term "transverse" or "radial" shall refer to a direction substantially orthogonal to the axial direction.

Referring now to the drawings in detail, as shown in FIG. 1, one embodiment of the present invention includes a cutting bit 10 formed as a core bit of the type commonly referred to as an open-end core bit. As shown, bit 10 includes a cutter 12 of substantially cylindrical construction. The cutter has an annular cutting end 14 including an array of conventional cutting elements 16 disposed thereon. Cutting elements 16 may include any number of cutting devices as known in the art, such as, for example, conventional bonded abrasive segments 17 brazed, welded or otherwise fastened to ring 12, as shown in FIG. 5.

In this regard, turning now to FIG. 5, the number of discrete segments 17 and their spacing around the edge of ring 12 to which they are attached can vary somewhat depending on the size of the ring, the size of the body and the cutting application. In general however, for core drill bits having a diameter of from about 50 mm to 500 cm, from about 2 up to several hundred segments 17 may be used. Smaller or larger diameter drill bits may use fewer or more respectively. The abrasive component or grain of segments 17 may be any one of those commonly used for such applications, the grit being chosen depending on the hardness of the material to be cut. Thus the grain may be aluminum oxide, silicon carbide, silicon nitride, tungsten carbide, a superabrasive such as diamond or cubic boron nitride (CBN), alumina, seeded or unseeded sol-gel alumina or other abrasive grains and combinations of abrasive grains. Superabrasives are usually preferred though the superabrasive component may be diluted with less expensive abrasive grits. The abrasive is typically held in a metal bond or matrix and the adhesion to the bond may be enhanced by metal coating the grain with a metal such as nickel, before it is incorporated in the segment. The metal matrix may comprise cobalt, iron, bronze, nickel alloy, tungsten carbide, chromium boride or other metals and their alloys and mixtures.

Segments 17 may be thus provided with substantially any known composition, including, for example, providing the segments with at least two circumferentially spaced regions wherein superabrasive grains are alternately dispersed in the regions in high and low concentrations of superabrasive grains. Segments of this type are disclosed in U.S. Pat. No. 5,518,443 which is hereby incorporated by reference in its entirety, herein.

The segments are preferably secured to ring 12 by conventional welding techniques. As shown in FIG. 5, conventional segments 17 generally have a substantially elongated or rectangular cubic configuration with one long edge being welded to ring 12. As also shown, in a core bit embodiment, segments 17 are bowed along their lengths to allow the long edge to conform to the annular edge of the ring 12 to which it is secured. Thus the segments project axially from the ring by the amount of their width. The thickness or radial dimension c of the segments is conventionally the same as, or greater than, the thickness of the ring and body to which they are secured.

An example of segments capable of use in conjunction with the present invention include a bond of a 70/30 (percent) cobalt/bronze mixture with the grain being an equal parts mixture of 30/40 and 40/50 mesh DeBeers SDA 85+ diamond in a concentration of 7.5 vol% (volume percent). Each segment has a length of 49.2 mm and a radial or kerf dimension of 3.2 mm.

Alternatively, the cutting elements may include teeth formed integrally with ring 12 with or without additional treatment to increase the hardness or abrasive aspects thereof. In this regard, for example, cutting elements 16 may include integral teeth having a single layer of abrasive grains chemically bonded thereto in the manner disclosed in commonly assigned U.S. patent application, Ser. No. 08/616,538 which is hereby incorporated by reference in its entirety, herein. Teeth fabricated in this manner are referred to hereinbelow as "contoured, brazed, single layer abrasive tools" or alternatively, "contoured cutting elements."

Ring 12 also includes an annular shaft engagement end or coupling end 18, which, as shown, is preferably fabricated as a female coupling or socket. Engagement end 18 is adapted to receivably engage a ring engagement end 22 of a substantially cylindrical non-metallic body, shaft or tube 24. Engagement end 22 is preferably fabricated as a male coupling or plug as shown.

Ends 18 and 22 are sized and shaped to maintain shaft or tube 24 and ring 12 in concentric, end to end engagement with sufficient structural integrity to withstand torsional and axial loading common to core or hole drilling applications, without slippage or breakage. Moreover, ends 18 and 22 are preferably bonded to one another in their engaged positions using a predetermined bonding agent or adhesive, as will be discussed hereinbelow.

Non-metallic shaft 24 extends a predetermined axial distance from ring engagement end 22 and terminates at a back end 25 that is open in the manner characteristic of conventional open-end type core bits. Back end 25 is adapted to receive a fixture (not shown) commonly used with open-end type metal-body core bits, to secure bit 10 to a drill motor or driver (not shown) of a conventional core drill.

In this regard, during drilling operations, bit 10 is adapted to rotate about concentric axis or axis of rotation f so that the array of cutting elements 16 will form a notional cylinder having an inner diameter dI and an outer diameter dO, as will be discussed in greater detail hereinafter.

In a preferred embodiment as shown, ring 12 and tube 24 are each provided with inner and outer diameters that define predetermined wall thicknesses t1 and t2, respectively. Wall thicknesses t1 and t2 are substantially uniform along the length or axial dimension of the tube and cutter, with the exception of engagement ends 18 and 22. Engagement ends 18 and 22 are each fabricated as stepped-diameter portions of ring 12 and tube 24, respectively. In this regard, the engaged end portions of the ring and tube are provided with predetermined wall thicknesses t3 and t4, substantially thinner than wall thicknesses t1 and t2, respectively.

Wall thicknesses t1, t2, t3 and t4 are predetermined so as to enable cylindrical surfaces 34 and 36 of engagement ends 18 and 22 to interengage one another in a manner ranging from an interference to a sliding fit, while preferably providing sufficient clearance for application of an adhesive material therebetween.

As shown, steps 26 and 28, and end faces 30 and 32 each extend substantially orthogonally to the axial direction. In this manner, the engaged steps and end faces are adapted to transmit the axial loading of the bit between ring 12 and tube 24, nominally without transmitting a component thereof in the radial direction during cutting operations. In the event the mating steps and end faces were disposed at oblique angles relative the axial direction, axial loading may tend to disadvantageously deflect tube 24 radially proximate ring engagement end 22 thereof.

Surfaces 34 and 36 are preferably provided with substantially identical axial dimensions so that steps 26 and 28, and faces 30 and 32, may be bonded in respective surface to surface engagement with one another when engagement ends 18 and 22 are fully mated. These axial dimensions, moreover, are predetermined to provide sufficient contact area between surfaces 34 and 36, so as to, in combination with the dimensions of wall thicknesses t1, t2, t3 and t4, substantially prevent bit 10 from bending or buckling under the axial loading or weight on bit (WOB) loading common to conventional core drilling operations. Such WOB levels typically fall within a range of approximately 50–500 Kg.

With regard to the foregoing, the wall thicknesses are increased as the average diameter of bit 10 increases. The following Table I provides representative wall thicknesses used in commercial practice for various diameters of steel bodied core bits. The same wall thicknesses are preferably utilized for wall thicknesses t1 and t2 of ring 12 and polymer tube 24, respectively.

TABLE I

Representative core bit tube wall thickness for various core bit sizes.

| Core Bit Diameter, inch (cm) | Wall Thickness, inch (cm) |
|---|---|
| 0.5–1.0 (1.3–2.5) | 0.04 (.1) |
| 1.0–2.0 (2.5–5) | 0.06 (.15) |
| 2.0–6.0 (5–15.2) | 0.08 (.2) |
| 6.0–10.0 (15.2–25.4) | 0.1 (.25) |
| >10.0 (25.4) | 0.12 (.3) |

Wall thickness t4 of non-metallic tube 24 is preferably approximately one-half to two-thirds of wall thickness t2. Wall thickness t3 of ring 12 is sized to enable surface 34 thereof to slidably engage surface 36 as discussed hereinabove.

Ring 12 is preferably fabricated from a conventional metallic material such as steel and may be formed by any convenient process, such as by machining, extrusion or casting. In one preferred embodiment, ring 12 is fabricated in a manner commonly employed to fabricate conventional core bits, with tube engagement end 18 machined to provide wall thickness t3.

Non-metallic tube 24 may be fabricated from a variety of materials, such as, for example, plastics, plastic composites, wood composites, ceramics, ceramic composites and combinations, metal particle or ceramic particle filled plastic, Polyvinyl Chloride (PVC), acrylic polymer, glass fiber reinforced plastic (GFRP) and polyamide (nylon). Throughout this disclosure, the term "glass fiber reinforced plastic" or "GFRP" shall be understood to include substantially any plastic bond or matrix material, including, for example, an epoxy resin, reinforced with glass fibers. Similarly, the term "fiber reinforced plastic" shall be understood to include any plastic bond or matrix material including epoxy resin, reinforced with any suitable fiber such as, for example, carbon fiber, glass, polyacrylonitrile (PAN) fiber, and mixtures thereof.

In general, preferred non-metallic materials for use in fabrication of tube 24 include any thermoset or thermoplastic polymer, and their reinforced composites. The following Table II lists some of the many thermoset and thermoplastic polymers that may be utilized.

Table II. Polymeric materials and reinforcing materials for fabricating tool body.

| Thermosets | Thermoplastics | Reinforcing Materials |
|---|---|---|
| Polyester SMC | acrylics, cellulosic, phenolic | glass fiber: S-glass or E-glass |
| epoxies | Polyethylene, Polypropylene | graphite fiber |
| phenolics | PVC and other vinyl polymers | Aramid Fibers (Kevlar) |
| amino plastics | Polystryrene, ABS, Acetal | Polyacrylonitrile (PAN) fibers |
| unsaturated polyesters | nylon, Polycarbonate | Boron fibers |
| | Polyether Sulphone, Polyimide | metal fibers or wire mesh |
| | Polyurethane | Calcium Carbonate particles |
| | Ultra High Molecular Weight Polyethylene | Aluminum Silicate particles |
| | low density polyethylene | SiC particles or whiskers |

Examples of core bits 10 fabricated from several of the above-referenced materials have been tested and found to perform comparably to conventional metallic core bits, as will be discussed in greater detail hereinafter.

Tube 24 may be fabricated by any convenient method, such as, for example, molding, machining or extrusion. For example, tube 24 may be extruded, followed by machining operations at ring engagement end 22 to provide wall thickness t4.

Any number of adhesives may be utilized to bond ring 12 to tube 24. In one example utilizing a tube 24 fabricated from PVC, an epoxy resin and hardener mixture sold under the designation Torr-seal®, available from Varian Vacuum Products of Lexington, Mass., was applied uniformly to the mating surfaces of tube engagement end 18 and ring engagement end 22, prior to assembly thereof, to bond the ends in mating engagement with one another. Although this particular resin was used successfully, a variety of other adhesives may be used for joining the metal ring to the polymer tube. The choice of adhesive may be made based on the specific materials to be joined. Examples of additional adhesives generally suitable for joining metals to various plastics, that may be employed in this regard, include urethane, neoprene, nitrile, polyamide, polyester and cyanoacrylate adhesives. Melt lamination, wherein heat and pressure are used to join metal and plastic, may also be used to join the metal ring to the tube. Other joining methods include mechanical interlocking techniques, injection molding the tube in-situ with the metal ring, and combinations of these methods which will be familiar to those skilled in the art. For example, the metal ring may be keyed in a manner similar to that shown in FIG. 9. In this manner, the ring may be interlocked with cut-outs disposed in the plastic body, or alternatively, molded integrally with the plastic body. Alternatively, the metal ring may be perforated and integrally molded to the plastic body.

Figure 9:
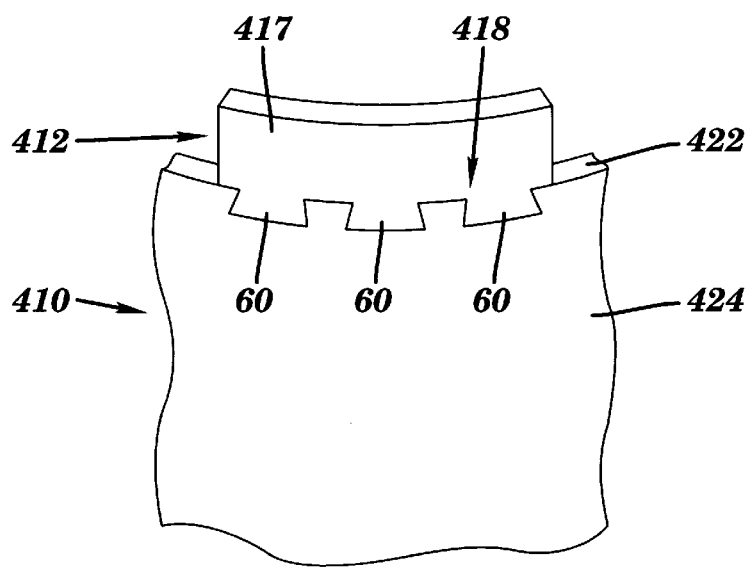
FIG. 9 is a perspective schematic representation of a portion of an additional embodiment of a non-metallic body cutting bit of the present invention.

Moreover, referring to FIG. 9, in an additional embodiment, the present invention includes a cutting tool 410 that effectively eliminates the metallic ring portion of cutter 12 and rather utilizes a cutter 412 that consists entirely of cutting elements or abrasive segments 417. As shown, abrasive segments 417 are keyed along one edge to provide a series of keys 60 adapted to be interlocked and/or integrally molded to plastic body 424 as shown. In this manner, keys 60 effectively comprise coupling end 418 of cutter 412, adapted for engagement with cutter engagement end 422 of body 424 as shown.

Figure 2:
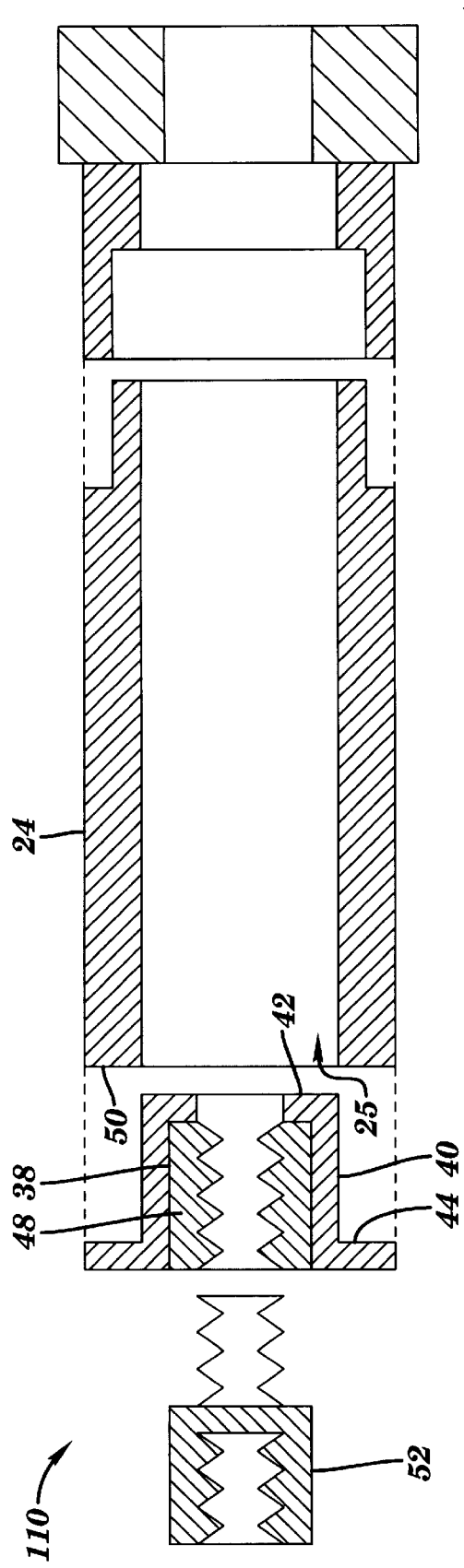
FIG. 2 is a cross-sectional, elevational, partially exploded schematic view of another embodiment of a non-metallic body cutting bit of the subject invention, including portions of means for mounting the cutting bit to a conventional drill motor.
Figure 3:
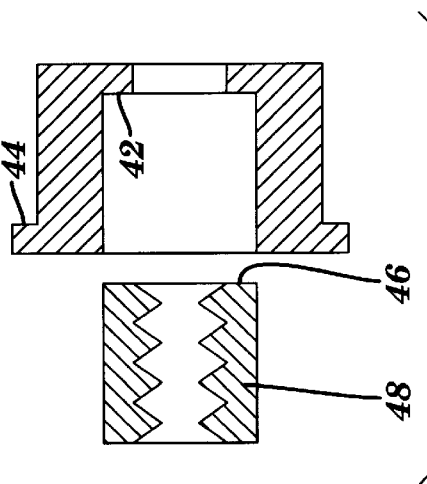
FIG. 3 is a cross-section, elevational, exploded schematic view of a portion of the non-metallic body cutting bit of FIG. 2.
Figure 4:
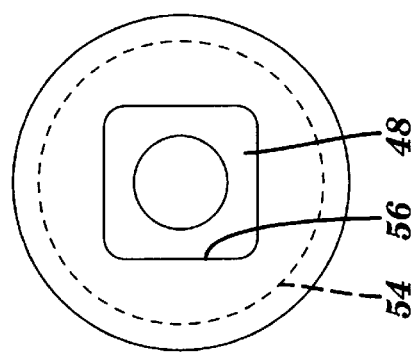
FIG. 4 is a plan view, with portions thereof shown in phantom, of the portion of the non-metallic body cutting bit of FIG. 3.

Referring now to FIGS. 2–4, an alternate embodiment of the present invention comprises a plastic bodied bit 110 fabricated as a conventional closed-end type core bit. Referring to FIG. 2, the configuration of bit 110 is substantially similar to that of open-end type bit 10, but for the provision of a closed end 126 by closing back end 25 with a back end connector 38.

Back end connector 38 includes an elongated tubular portion 40 adapted for receipt within back end 25. An insert retention flange 42 extends radially inward at one end thereof, while an axial compression flange 44 extends radially outward from the other end thereof. Flange 42 is adapted to engage leading face 46 of a threaded insert 48 and prevent relative movement therebetween when subjected to the aforementioned axial compressive loading. Flange 44 is adapted to engage end face 50 of back end 25 to similarly resist axial movement therebetween.

Insert 48 is adapted to threadably receive a conventional adapter 52 commonly utilized to secure closed-end type core bits to a core drill (not shown).

Referring now to FIG. 4, insert 48 is provided with a generally cylindrical outer surface 54 adapted for concentric, surface to surface engagement with tube 24. Inner surface 56, however, is provided with a non-circular (generally square, as shown) transverse cross-section, sized and shaped to receive insert 48 in surface to surface engagement therewith. One skilled in the art will recognize that such non-circular construction advantageously serves to resist slippage between insert 48 and connector 38 due to torsional forces exerted therebetween during drilling operations. However, a circular construction may be used provided the tool is effective in the desired drilling operation.

Connector 38 is preferably fabricated from the same material, and in a similar manner as tube 24. In one test, for example, connector 38 was machined from solid PVC stock. The connector is bonded in fully mated engagement with tube 24, wherein flange 44 is engaged with end face 50, utilizing an adhesive of the type described hereinabove suitable for bonding plastic to plastic.

Insert 48 is fabricated in the manner and from materials similar to those utilized for ring 12. The insert is inserted and fastened to connector 38 in place as shown in FIG. 2 in a manner described hereinabove for joining bond ring 12 to tube 24. In a preferred embodiment, the insert is bonded in place using an adhesive as described hereinabove.

This construction thus advantageously fastens bit 110 to adapter 52 with sufficient strength to resist the torsional and axial forces attributed to conventional core drilling operations, nominally without the application of radial forces to tube 24. In this regard, conventional steel bodied core bits are generally secured to the adapter of the motor drill with a pressure fit coupling that serves to apply radially outward pressure on the inner surface of the tube. The present invention, by use of flanges 42 and 44 that extend radially, rather than obliquely relative the axial direction, thus advantageously transmits the axial WOB loading nominally without radial loading.

Depending on the application and the plastic material utilized, during operation, tube 24 of the present invention may abrade and thus decrease in wall thickness to some degree. However, as shown in FIGS. 6 and 7, this phenomenon may be compensated to minimize or effectively eliminate any potentially detrimental effects thereof. Referring to FIG. 6, bit 10 utilizes cutting elements 16 which, in a manner common to conventional core bits, initially have a radial dimension a that is greater than wall thickness b of tube 24. Thus, the notional cylinder formed during the aforementioned rotation of the bit about its concentric axis f (FIG. 1) will have an inner diameter dI (FIG. 1) and an outer diameter dO (FIG. 1) which effectively provide a clearance d1 (FIG. 6) on either side of the tube wall. This clearance tends to reduce any abrasion and/or binding between tube 24 and the kerf to maintain cutting efficiency. Conventional cutting elements 16, particularly those formed as conventional sacrificial-type grinding segments, tend to wear in the radial directions during use, wherein radial dimension a is reduced. Such wear effectively reduces clearance d1. Thus, in a standard core bit where a steel body is used, wall thickness b is determined to be the smallest capable of providing the bit with sufficient structural integrity. This minimal wall thickness is provided to maintain sufficient clearance d1 even after substantial segment wear, to effectively prolong the usable life of the core bit. Fabrication of the tubes with such minimal thickness is desirable because the steel does not wear appreciably during cutting operations.

Referring now to FIG. 7, an additional embodiment of the present invention includes a polymer bodied bit 210 that is substantially similar to bits 10 and 110, with the exception of providing a relatively thicker plastic tube 224. As shown, tube 224 is provided with a predetermined initial wall thickness c determined to compensate for reduction thereof due to wear during drilling operations. In this manner, as shown, wall thickness c may be initially greater than the thickness of a comparable steel body, such as thickness b, (FIG. 6) while still being less than segment width a, (i.e., c<a) to provide adequate clearance d2 relative a fresh (unworn) segment 16. Subsequent wear of the segment will be accompanied by wear of the tube 224 to effectively maintain adequate clearance d2 throughout drilling operations. This will advantageously provide a relatively longer useful life of bit 210, nominally without the threat of binding when radial dimension a decreases, provided that the wear rate of the tube wall is equal or greater than the wear rate of the segment thickness. Stated another way, dc/dt should be greater than or equal to da/dt, where dc/dt is wear rate of the polymer wall and da/dt is the wear rate of the segment thickness.

Core bits made with four types of polymeric materials have been tested by drilling cores in concrete blocks. The testing was conducted at 20 Amp constant current, 600 rpm spindle speed and 1 gal/min (3.8 liters/min) coolant flow rate. The concrete blocks used for testing were made with the following mix and design:

| Ingredient | Weight % |
| --- | --- |
| Cement: | 17 |
| Granite aggregate (¾' or 2 cm avg. size) | 40 |
| Sand | 34 |
| Water | 9 |

The blocks cast were 36" (91.4 cm) long, 18" (45.7 cm) wide and 12" (30.5 cm) high. Each block was cast with ⅝" (1.6 cm) diameter rebar (60 kpsi, 41 kN/cm² steel). The blocks were cast and cured in a fog room for 28 days. The compressive strength of the concrete blocks is 7 kpsi (4.8 kN/cm²).

The four polymeric materials used for fabricating the tested core bits include PVC, Acrylic, nylon and glass fiber reinforced plastic (GFRP). Any recorded decrease in wall thickness for the polymer body bits is presented along with the performance data. Table III below summarizes the performance of the bits for each of the polymer materials. The segment wear performance, the wall thickness wear of the body, the rate of penetration (ROP), the average weight on bit (WOB) and the maximum weight on bit is set forth for each example. The corresponding values for a typical metal body core bit are also presented.

Table III. Summary of the tests conducted on various types of polymer core bits.

| Core Bit Body | Wall Thickness Wear | Segment Wear, m/mm* | ROP, cm/min | WOB, KG Average | Maximum |
|---|---|---|---|---|---|
| PVC | 0.0148" (0.038 cm) (after 27 holes drilled) | — | 5.2 ± 0.4 | 119 ± 6 | 171 |
| Acrylic | 0.0062" (0.016 cm) (after 31 holes drilled) | 2.39 | 7.2 ± 1.3 | 124 ± 4 | 300 |
| GFRP | — | 2.34 | 6.5 ± 0.4 | 205 ± 13 | 266 |
| Nylon | 0.0399" (0.101 cm) (after 165 holes drilled) | 16 | 6.4 ± 0.1 | 181 ± 23 | 349 |
| Metal (steel) | — | 15.9 | 6.3 ± 0.7 | 184 ± 22 | 328 |

*Meters drilled per millimeter wear of abrasive segments.

The test results indicate that all of the polymer body bits performed within generally acceptable ranges without failure. Moreover, in the case of the nylon-body core bit, the cutting elements or segments attached thereto were the same type as those attached to the metal-body core bit. Thus, in this case, a direct comparison of the segment wear performance and rate of penetration of these bits indicates that performance of the nylon body core bit is comparable to that of the metal body bit. The remaining core bits utilized cutting elements representative of conventional cutting applications but that were not identical to those attached to the metal body. Thus, a direct comparison of segment wear characteristics may not be useful.

Various 4" (10.2 cm) diameter core bits with metal bodies and polymer bodies have been weighed to determine the weight savings while using a polymer body core bit. The following Table IV below summarizes the measurements. As shown, the polymer body core bits are over 50 percent lighter than comparable steel body bits. Moreover, it is anticipated that the weight of the polymer body core bits may be still further reduced by further reductions in the size of the metal portions of the polymer body bits.

TABLE IV

Comparative weights of steel body and polymer body segmented 4" (10.2 cm) diameter core bits.

| Manufacturer | Type | Length, cm | Weight, Kg |
|---|---|---|---|
| Diamond Products (US) | Steel | 37 | 3.23 |
| Truco (US) | Steel | 39 | 2.83 |
| Nimbus (Europe) | Steel | 45 | 3.73 |
| Van Moppes (Europe) | Steel | 50 | 3.60 |
| Norton (US) | Steel | 37 | 2.78 |
| Norton | nylon | 37 | 1.20 |
| Norton | PVC | 37 | 1.29 |
| Norton | Acrylic | 37 | 1.28 |

As mentioned hereinabove, the present invention may be utilized in combination with integral teeth such as, for example, the aforementioned contoured cutting elements. Metal and polymer body core bits with contoured cutting elements were tested in cinder block. The cinder blocks are masonry blocks similar to those described hereinabove, but having fine (less than 0.25 in or 0.64 cm) aggregate. The testing was conducted at a 20 Amp constant motor current, 600 rpm spindle speed, and 1 gal/minute (3.8 liters/min) coolant (water) flow rate. The bit wear performance, the rate of penetration (ROP), the average weight on bit (WOB), the maximum weight on bit and the wear performance of the metal and polymer tube wall were recorded. Table V below summarizes the performance of the bits.

The life of the nylon body contoured cutting element bit is comparable to that of the steel body bit. The ROP of the nylon bit is similar if not slightly better than, the steel body contoured cutting element bit. The data shows the performance of the nylon body core bit is comparable to, if not better than, that of the metal body contoured cutting element bit. The weight on bit (WOB) data indicates that the nylon body bit experienced loads similar to the metal body bit and performed well without experiencing any difficulty. Earlier testing of different polymer tubes suggested that a variety of polymer tubes can perform the same function as the steel tube. Thus, it is expected that polymer tubes other than nylon also can be successfully used for contoured cutting element tools.

TABLE V

Summary of the tests conducted on polymer and steel body contoured cutting element core bits.

| Core Bit Body | Wall Thickness Wear | Wear performance, m/mm* | ROP, cm/min. | WOB, Kg Average | Maximum during test |
|---|---|---|---|---|---|
| nylon | 0.013" (0.03 cm) | 5.3 | 19.4 ± 3.1 | 106 ± 10 | 374 |
| Metal (steel) | 0.004" (0.01 cm) | 5.5 | 16.4 ± 3.9 | 98 ± 15 | 392 |

*Meters drilled per millimeter wear of abrasive segments.

The wear of the steel tube section and polymer tube section was monitored. It was observed that over the life of the bits, the nylon tube wall wore by a total of 0.013" (0.03 cm) while the steel tube wall wore by about 0.004" (0.01 cm). Although the wear of the polymer tube is higher, the nylon tube had sufficient wall thickness to withstand the stresses during drilling through out the life of the bit.

As shown in the following Table VI, the weight of the polymer contoured cutting element core bit compares favorably to that of a conventional steel body contoured cutting element core bit.

TABLE VI

Comparative weights of steel body and polymer body contoured cutting element core bits.

| Type | Length, cm | Weight, Kg |
|---|---|---|
| Steel | 30 | 3.80 |
| nylon* | 30 | 2.46 |

*The contoured cutting element bits have a heavy end connector made of steel. The weight of this may be reduced by replacing at least a part of it with polymer material (as in the case of segmented bits). This should further reduce the weight of the polymer bit significantly.

Figure 8:
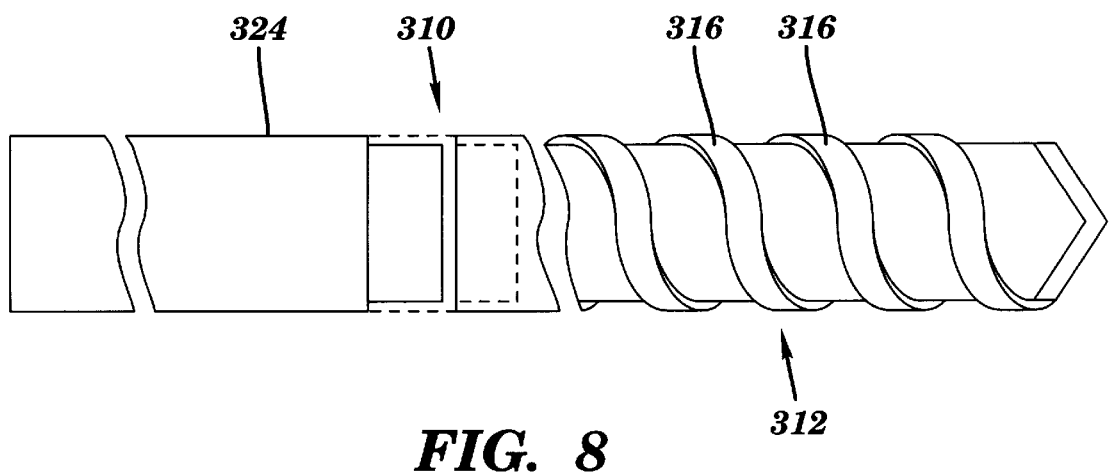
FIG. 8 is an elevational, schematic view of still another embodiment of the present invention.

In addition to the hollow core embodiments described hereinabove, it is contemplated that the present invention may be practiced using conventional solid core drill bits. In this regard, attention is directed to FIG. 8, in which an additional embodiment of the present invention is shown as bit 310. Bit 310 is fabricated as a conventional solid core drill bit of the type commonly used for hole drilling operations in materials such as wood, metal, plastic, masonry, brick, etc. As shown, bit 310 is substantially similar to bit 10, with the exception that plastic shaft 324 is substantially solid and cutting elements 316 comprise helical threads of the type common to conventional solid core drill bits. In this regard, the helically threaded cutting elements 316 may comprise tungsten carbide inserts brazed onto the bit, steel (for use in high speed drilling operations) or the aforementioned contoured cutting elements using for example, diamond abrasive.

The present invention as described hereinabove and as illustrated in the preceding test data, produced results that were both non-obvious and surprising in light of the teachings of the prior art also described hereinabove. In this regard, as discussed hereinabove, plastic materials tend to be particularly susceptible to abrasion. In core or hole drilling applications, the main body of a bit remains in the kerf or bore throughout the entire cutting operation. This contrasts with circular disc cutting operations in which the blade is disposed within the kerf for only a portion of each blade revolution. One may thus expect this relatively increased contact of the main body with the kerf in drilling operations to increase the potential for abrasion and failure of the plastic body. As shown, however, this effect is either nominal, or capable of being adequately compensated.

Another concern militating against success of a polymer body cutting bit is abrasion due to prolonged contact with the grinding swarf. As also discussed hereinabove, nominally only the outer periphery of a circular disc blade contacts the swarf. Contrariwise, in core or hole drilling operations, the swarf tends to remain in the kerf, in intimate contact with a relatively large portion of the cylindrical body throughout the duration of the cutting operation. This factor, however, has surprisingly proven nominal in many applications, while also capable of compensation as discussed hereinabove.

Another aspect of the present invention was the realization that as opposed to the prior art disc blades discussed hereinabove, the present invention achieves sufficient structural integrity without the need to fortify the plastic material with fiber reinforcements. Indeed, bit 10 performed satisfactorily, without bowing or torsional failure, even when subjected to the maximum torque of the drilling machine as occasioned by the bit becoming jammed during test drilling. These results were surprising in light of the constant stresses that core bits are subjected to during drilling operations.

As discussed hereinabove, the polymer tubes of the present invention withstand the typical stresses experienced by core bits. However, as also discussed, the walls of the polymer tubes may tend to wear faster than steel counter parts. In particular, it has been observed that when particularly robust, premium quality segments are used, the polymer tubes do not last as long as the segments. The swarf generated during drilling tends to wear the polymer tube wall and over time the wall thickness is reduced to an extent beyond which the polymer tube cannot be used for drilling.

Several approaches may be taken to address this issue. One approach is to modify the thicknesses of cutting elements or segments 16 and the walls of tube 24, 224 as discussed hereinabove so that the tube outlasts the segment. Another approach is to improve wear resistance of the polymer tubes by appropriate surface treatment or by otherwise modifying the composition thereof.

This latter approach of modifying the composition of the polymer material has been shown to significantly improve the life of the polymer tubes to effectively provide lightweight, inexpensive, non-metallic bodied core bits that are capable of withstanding the stresses and aggressive environments experienced by metal-body core bits. Advantageously, this enables the use of conventional cutting element or segments 16 of the type commonly used for metal-body bits, on polymer-body bits.

Figure 10:
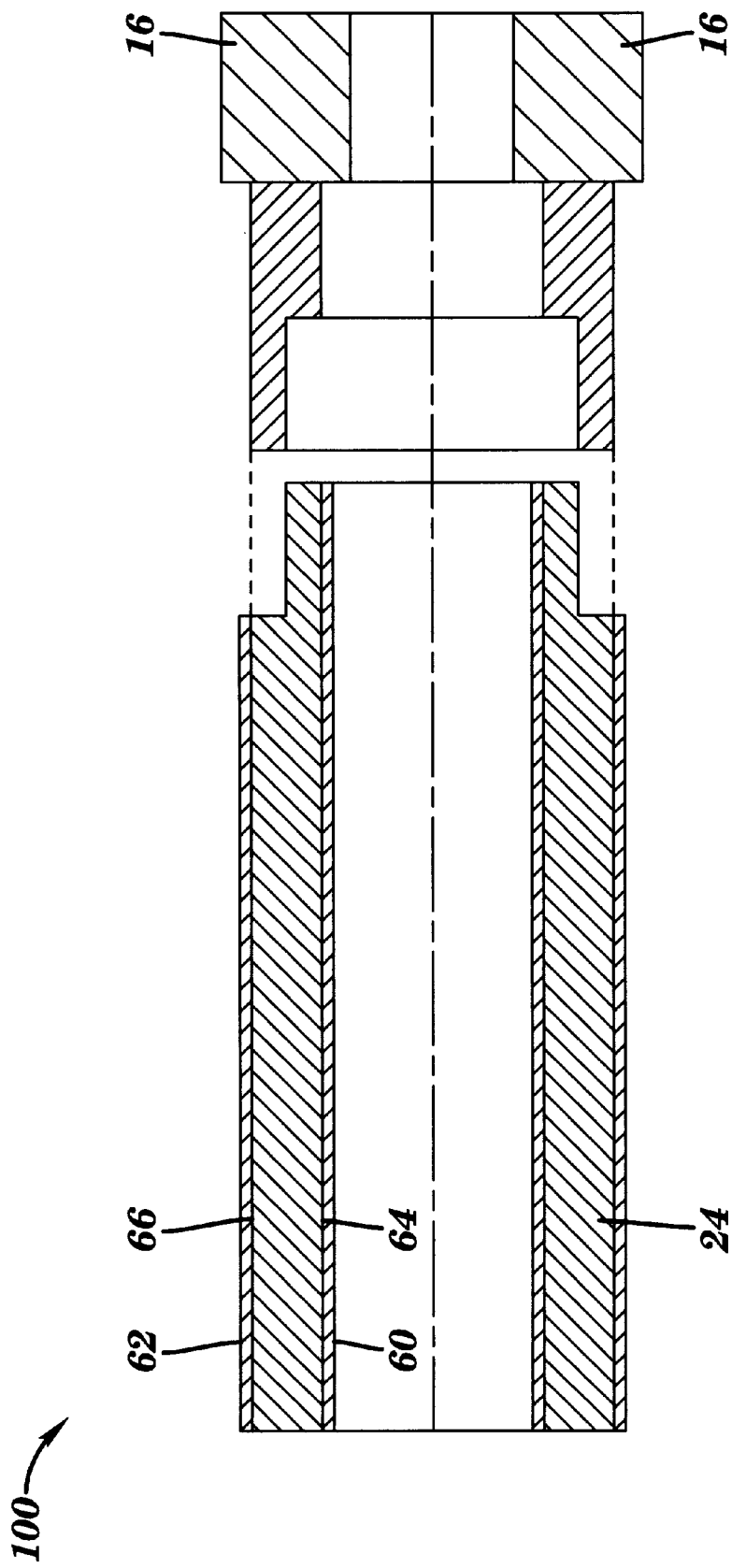
FIG. 10 is a cross-sectional, elevational, exploded schematic view of an alternate embodiment of a non-metallic body cutting bit of the subject invention.

One such modification of a polymer tube 24 is incorporated into an alternate embodiment of the present invention shown as cutting bit 100 in FIG. 10. Bit 100 includes layers 60 and 62 disposed on inner and outer surfaces 64 and 66, respectively, of the tube 24. Layers 60 and 62 include an abrasion resistant material, such as fine ceramic or metal particulate/powder, i.e. alumina, silicon carbide, silicon nitride, silica, tungsten carbide, boron nitride or metal (or alloy) powders. Examples of suitable metal particles include: Fe, nickel, Co, steels, bronzes and nickel alloys. Suitable ceramics include SiC, $SiO_2$, WC, $Al_2O_3$ and Co-WC. Filaments or fibers of these materials or of glass, quartz or Carbon may be used. Particulate having an average particle size (diameter) within a range of approximately 10–500 microns ($\mu$m) are preferred for use in the present invention, but particles or filaments of any size may be used, provided they can be adhered to the tube surface by a bond of sufficient mechanical strength to withstand drilling forces.

Abrasive grain particles such as silicon carbide, conventional alumina, alumina-zirconia (Norzon®) or MCA abrasive grains are preferred for this purpose. As used herein, the designation "MCA" refers to seeded or unseeded sol-gel alumina abrasive grain, including (microcrystalline alumina).

MCA particulate may be made by a process comprising peptizing a sol of an aluminum oxide monohydrate so as to form a gel, drying and firing the gel to sinter it, and then breaking, screening and sizing the sintered gel to form polycrystalline grains made of alpha alumina microcrystals, (e.g., at least about 95% alumina).

In addition to the alpha alumina microcrystals, the initial sol may further include up to 15% by weight of spinel, mullite, manganese dioxide, titania, magnesia, rare earth metal oxides, zirconia powder or a zirconia precursor (which can be added in larger amounts, e.g. 40% or more), or other compatible additives or precursors thereof. These additives are often included to modify such properties as fracture toughness, hardness, friability, fracture mechanics, or drying behavior.

Many modifications of alpha alumina sol gel grain have been reported. All grains within this class are suitable for use herein and the term MCA grain is defined to include any grain comprising at least 60% alpha alumina microcrystals having at least 95% theoretical density and a Vickers hardness (500 grams) of at least 18 GPa at 500 grams. The microcrystals typically may range in size from about 0.2 up to about 1.0 microns for seeded grain and from greater than 1.0 to about 5.0 microns for unseeded grain.

Once the gel has formed, it may be shaped by any convenient method such as pressing, molding, or extrusion and then carefully dried to produce an uncracked body of the desired shape.

After shaping, the dried gel can then be calcined to remove essentially all volatiles and transform the various components of the grains into ceramics (metal oxides). The dried gel is generally heated until the free water and most of the bound water is removed. The calcined material is then sintered by heating and is held within a suitable temperature range until substantially all of the alumina oxide monohydrate is converted to alpha alumina microcrystals.

As mentioned earlier the sol-gel alumina may either be seeded or unseeded. With seeded sol-gel aluminas, nucleation sites are deliberately introduced into or created insitu in the aluminum oxide monohydrate dispersion. The presence of the nucleating sites in the dispersion lowers the temperature at which alpha alumina is formed and produces an extremely fine crystalline structure.

Suitable seeds are well known in the art. Generally they have a crystal structure and lattice parameters as close as possible to those of alpha alumina.

Unseeded sol-gel alumina abrasive may also be used. This abrasive can be made by the same process described above, except for the introduction of seed particles. Sufficient rare earth metal oxides or their precursors may be added to the sol or gel to provide at least about 0.5% by weight and preferably about 1 to 30% by weight rare earth metal oxide after firing.

Examples of suitable sol-gel alumina abrasive grain and filaments for use in the present invention are disclosed in U.S. Pat. Nos.: 4,314,827; 4,623,364; and 5,129,919; which are fully incorporated by reference herein.

The particular composition of each of the coatings 60 and 62 may be distinct from one another, or they may be substantially identical to advantageously simplify application thereof. In an alternative embodiment only one of the tube surfaces is coated. For example a protective coating 62 may be provided only on the outer surface 66. Water flow typically applied to the inside of the tube during drilling significantly reduces wear of the inner surface. In fact in several of the wear tests described hereinbelow, the wear resistant coating was applied only to the outer surface 66. The life of the polymer bit would of course be longer if both surfaces are coated.

In one embodiment, the layers of particulate may be maintained on surfaces 64 and 66 with an adhesive bond material. For example, ceramic/metal powder may be mixed with an epoxy adhesive and applied to the surfaces of the tube. Upon curing, the adhesive bonds the ceramic/metal particles to the tube to form the wear resistant layers 60 and 62. Such treatment has been shown to significantly increase the wear resistance and the life of the tube relative to uncoated polymer tubes, and has been shown to enable the tube to exceed the life of the segments.

As an alternative to adhesive, the abrasion resistant powder may be embedded in the surfaces 64 and 66 to form layers 60 and 62. Embedding may be performed by heating the particulate and then spraying it onto the surface of the tube at a suitable impinging velocity. The heated particles on impact will soften the polymer and embed themselves into the surface. The polymer, upon cooling, will harden and grip the particles. A similar, alternate method of embedding the particles in the surface of the polymer tube 24 is to heat the tube to a temperature predetermined to soften the surfaces 64 and 66, and then spray the ceramic/metal particles onto the surfaces at a predetermined velocity. The particles will embed in the surfaces and upon cooling, the surfaces 64 and 66 will grip the particles to form layers 60 and 62. The key parameters that control the embedding process and the quality of the coating include (a) surface preparation—cleaning and degreasing, (b) particle size (c) particle temperature (d) particle velocity and (e) polymer temperature.

The polymer surface should be cleaned of oils, grease and other surface contaminants before embedding the surface with particles. The presence of such surface contaminants may adversely affect the adhesion of the particles to the polymer surface. Cleaning and degreasing may be carried out by wiping, scraping, wire brushing, machining, grit blasting, or chemical action such as solvent cleaning.

The choice of particulate and polymer temperature, and spray velocity is predetermined based on the specific heat of the particulate, the specific heat of the polymer, the glass transition temperature or softening temperature of the polymer and the melting point of the particulate. In general, higher temperatures/softer polymers will require a lower spray velocity, while lower temperatures/harder polymers will require higher spray velocities.

When embedding heated particles, the particle temperature should be chosen so that upon impact, the particle can heat a volume of the polymer (typically 1 to 10 times the volume of the particle) to a temperature in excess of its glass transition temperature. The particle temperature also is preferably less than half its melting point to avoid deformation of the particle on impact. Mathematically, these conditions may be represented as follows:

$$m\, C_{p,\,particle}\, (T_{particle} - T_{ambient}) = V\, d_{polymer}\, C_{p,\,polymer}\, (T_g - T_{ambient}) + \text{Heat loss}$$

$$T_{particle} < 0.5\, T_m$$

where, m is the mass of the particle, Cp is the specific heat, T is the temperature, V is the volume of the polymer that has to be heated to embed the particle, $d_{polymer}$ is the density of the polymer, Tg is the glass transition temperature of the polymer, and $T_m$ is the melting point of the particle. A combination of particle size (which determines the particle mass, $4\pi r^3 d_{particle}/3$) and particle temperature can be chosen to satisfy these conditions. In practice, for a given particle size the particle temperature can range from Tg<Tparticle<0.5 Tm. Considering the range of polymer materials that can be used for the polymer tubes and the various metals, alloys and ceramics that can be used for the particles, the temperature of the particle can range from a 100° C. to 2000° C., preferably 120° C. to 1000° C. and in a particularly preferred embodiment, 150° C. to 600° C.

The particle size may be chosen so that the required particle temperature is practical. The particle size will also be dictated by the size of concrete particles in the slurry generated during drilling. It is expected that about two thirds of the ceramic/metal particle will be embedded in the polymer to ensure that it is not dislodged during the drilling operation. The remaining one third would project out of the surface. The particle size is preferably at least about 3 times the size of the concrete particles in the slurry. This tends to reduce wear of the polymer by limiting simultaneous contact of the concrete particle with both the polymer tube wall and the wall of the concrete block being drilled. As an upper limit, the particle projection should not be larger than the clearance (provided by the segment) between the tube wall and the concrete wall. With these factors in mind and the range of materials that are drilled, preferred particle size is expected to be in the range of about 10 to 500 microns.

The particle velocity should be chosen such that the kinetic energy of the particle is greater than the energy required to deform the polymer surface. The particle velocity will thus vary with the type of polymer and its yield strength, the mass of the particle, and the temperature of the particle. It is expected that suitable particle velocities will range from a few meters per second to hundreds of meters per second.

The starting temperature of the polymer may be the ambient temperature, or the polymer may be slightly heated to facilitate the embedding process. In either case the temperature of the polymer should not be allowed to increase beyond its glass transition temperature during the embedding process to avoid distorting the tube, as discussed hereinbelow.

When embedding particles into a heated polymer surface, the particle temperature may be maintained at ambient temperature or may be heated up to the glass transition temperature of the polymer. Heating the particles will ensure that the polymer is not cooled upon impact of the particle and thus will not limit the ability of the polymer to deform. The operating temperature, T, is:

$$T_{ambient} < T < T_{g, polyer}.$$

Considerations for particle size are similar to those discussed hereinabove for use in embedding heated particles.

The particle velocity is not expected to be as high as when embedding heated particles since the polymer surface is heated and is more readily deformed. The particle velocity is expected to range from a few m/s to tens of m/s.

The polymer temperature should be such that it is amenable to deformation on impact of the particles. It is generally desirable to keep the surface temperature as high as possible without reaching the glass transition temperature. Heating the polymer to the glass transition temperature may significantly distort the tube and render it unusable. On the other hand, too low a temperature would not allow for substantial local deformation to embed the particle. A practical operating temperature, T, for the process is:

$$0.5\, T_{g,\ polymer} < T < T_{g,\ polymer}.$$

The skilled artisan should recognize that any suitable method may be utilized to embed the particles in the surface of the polymer body, without departing from the spirit and scope of the present invention. For example, the tube and/or the particles may be pressed or molded onto a surface 64 and/or 66 of the polymer tube. Mold surfaces of a suitable mold may be coated with particles, the tube then inserted into mold and heated to embed the particles into the surface of the tube. Moreover, cutting elements 16 may be applied to the polymer tube in a similar manner, i.e. by placing in a suitable mold, followed by insertion of the polymer tube. In this instance, a unitary mold may be utilized to simultaneously embed the particles and attach the cutting elements 16. The surfaces 64 and 66 of the tube thus modified with the ceramic/metal layers 60 and 62 provide enhanced wear resistance relative to unmodified polymer tubes.

A still further method of embedding the particles in the surface of the polymer tube is to spray the polymer surface with particles using some variation of conventional thermal or plasma spraying techniques. For example, processing parameters of known thermal spraying techniques may be varied to permit proper bonding of the ceramic/metal particulate to the polymer tube surface while ensuring that the structural integrity of the tube is not compromised to the extent that it is no longer usable for core drilling operations. Examples of conventional thermal spray coatings are discussed on pp. 497–509 of the ASM HANDBOOK OF SURFACE ENGINEERING, vol. 5, in a Chapter entitled Thermal Spray Coatings, by Robert C. Tucker, Jr., published by ASM International, Materials Park, Ohio in 1994.

Various thermal and plasma spraying techniques have been developed to coat a variety of materials with metallic, ceramic and cermet (a metal ceramic composite) coatings. These include powder flame spray, wire flame spray, ceramic rod spray, two wire electric arc, nontransferred plasma spray, high-velocity oxyfuel, detonation gun and super-D gun. Any of these techniques may be used for coating the polymer with the wear resistant coating provided that the polymer is not heated beyond the glass transition temperature and rendered unusable.

Like the embedding techniques discussed above, the surface of the polymer should be degreased and cleaned to ensure good bonding of the coating to the polymer. In addition, a conventional surface roughening process may be used to improve the adhesion of the coating to the surface. The surface roughening can be done by grit blasting or rough threading or a combination of the two. The coating process is preferably carried out immediately after the surface cleaning and roughening process.

The range of process parameters for various thermal/plasma spray techniques are presented in the following Table VII. This Table provides information on typical coatings that can be obtained with different processes, and also includes preferred ranges of substrate temperatures and particle velocities. As shown in this Table, the substrate temperatures employed for these processes fall within the range that can be used for various polymers. These conditions may be optimized for specific polymers and coating materials.

TABLE VII

Thermal spray processes and typical processing conditions.

| Process | Coating Material | Feed material | Substrate temperature, C. | Particle Velocity, m/s |
|---|---|---|---|---|
| Powder flame spray | metallic, ceramic | powder | 105–160 | 65–130 |
| Wire flame spray | metallic | wire | 95–135 | 230–295 |
| Ceramic rod spray | ceramic, cermet | rod | 95–135 | 260–360 |
| Two-wire electric arc | metallic | wire | 50–120 | 240 |
| Nontransferred plasma | metallic, ceramic | powder | 95–120 | 240–560 |
| High-velocity oxyfuel | metallic, ceramic, cermet | powder | 95–150 | 100–550 |
| Detonation gun | metallic, ceramic, cermet | powder | 95–150 | 730–790 |
| Super-D gun | metallic, ceramic, cermet | powder | 95–150 | 850–1000 |

As an alternative to coating the surface(s) of the polymer tube, the tube itself may be fabricated from a reinforced polymer or polymer composite that includes the metal or ceramic particulate similar to that described herein above, whiskers, chopped fibers or filaments such as carbon or graphite fiber, Kevlar®, fiberglass, quartz, boron, alumina, silicon carbide, or PAN fibers known to possess superior wear resistance.

Wear tests were conducted with PVC tubes 24 coated with layers 60 and 62 of the following formulations: (a) "Liquid Plasteel™" (a mixture of epoxy and 80% by weight steel powder, commercially available from McMaster Carr Company of Dayton, N.J.; (b) a mixture of "Easy Epoxy™" (an epoxy commercially available from McMaster Carr Company and seeded MCA abrasive grain obtained from Saint-Gobain Industrial Ceramics, Inc. of Worcester, Mass.); (c) mixture of Liquid Plasteel™ and MCA grain; and (d) mixture of Liquid Plasteel™ and WC (Tungsten Carbide). An uncoated tube 24 was also similarly wear tested. The wear test consisted of lowering the tube into a hole which had been previously drilled in concrete blocks fabricated as described hereinabove. The tube was spun at an rpm typically used for drilling. While the tube was spinning, a predetermined amount of slurry (from previous drilling) was fed continuously into the hole. The slurry acted as an abrasive and tended to wear the polymer tube. The test was conducted for various tubes for a predetermined amount of time and the decrease in wall thickness was measured.

The wear test results for formulations (b)–(d) above, and for the uncoated tube, are presented in Table VIII.

TABLE VIII

| Layer | Wear After 330 Minutes |
|---|---|
| No Coating | 0.019" |
| Easy epoxy + MCA | 0.014" |
| Liquid Plasteel + MCA | 0.009" |
| Easy epoxy + WC | 0.017" |

This chart shows the average tube wear in 5.5 hours as determined by wall thickness measurements taken at three locations along the length of the tubes.

The results indicate that the coatings improve the wear resistance of the plastic tube 24, 224. Of the various coatings tested it appears that the best coating is a mixture of MCA and Liquid Plasteel™. Formulation (a) above, was performed as a control to determine whether Liquid Plasteel™ without the MCA would provide the improved wear resistance observed with formulation (c). The coating was eroded at several locations within half an hour of testing. Thus, it was evident that the presence of MCA along with the Liquid Plasteel™ was critical in formulation (c) for providing improved wear resistance to the tubes 24. It is hypothesized that the iron particles in the plastic steel may be too fine. An epoxy having coarser particle size as discussed hereinbelow with regard to embedding the particles into the tube surface may provide the desired wear resistance.

The results indicate that a coating comprising a mixture of Liquid Plasteel™ and MCA grain provided the best wear resistance among the coatings that were developed and tested. It is expected that similarly advantageous results may be achieved with other particles in this class of materials, such as those discussed hereinabove. In addition to the particle size, another factor determining the wear resistance provided by a particular layer 60 and 62 is the percentage of particulate therein. At least 20 weight percent, and preferably greater than 50 weight percent of particulate in an adhesive bond is preferred. A further consideration is the percentage of tube surface area covered by the layer 62 and/or 60. Particles embedded over greater than or equal to about 20 percent of the surface may provide desired wear resistance, although between 50 percent and 100 percent surface coverage is preferred.

Figure 11:
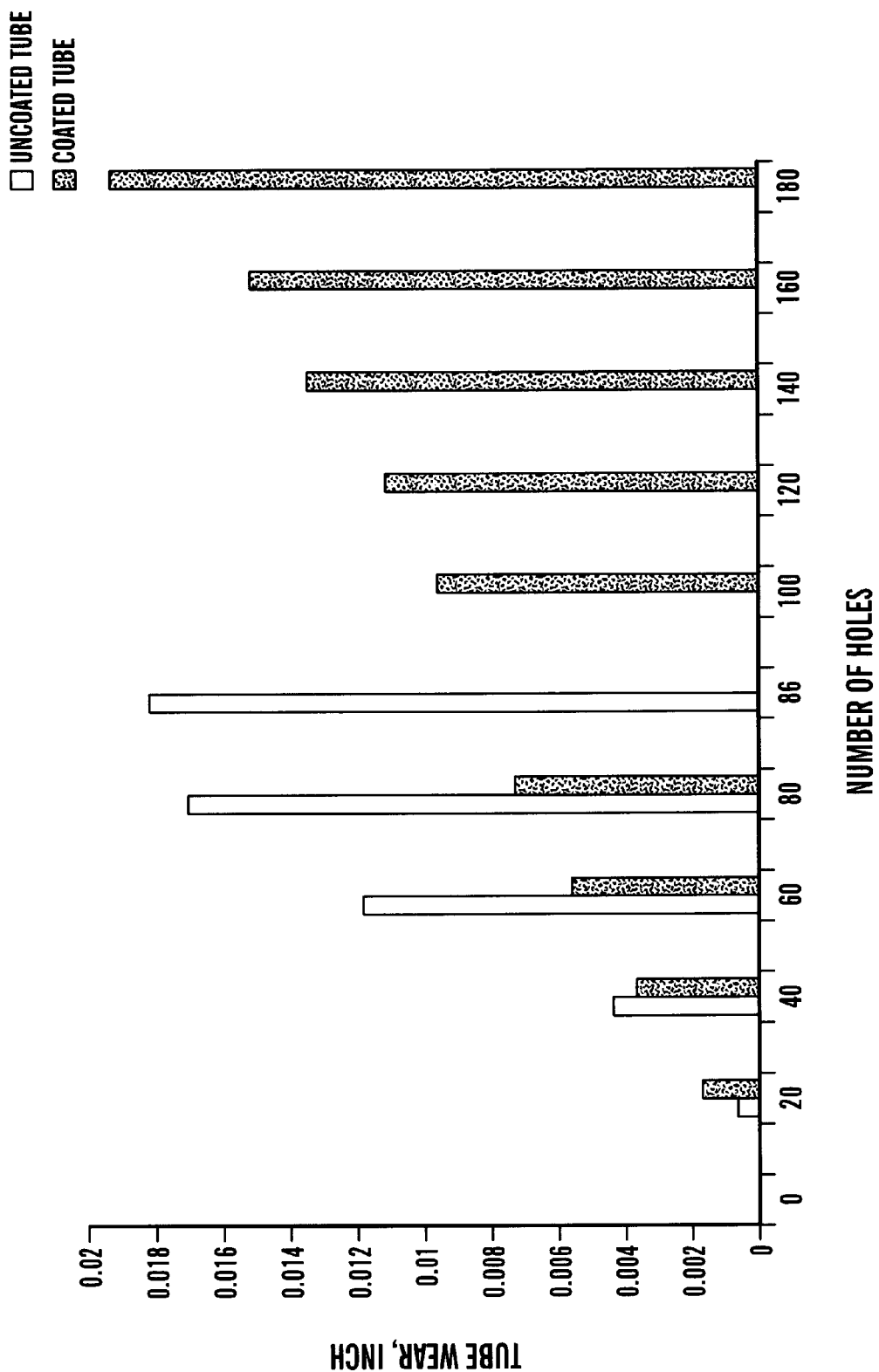
FIG. 11 is a graphical representation of wear test results of the present invention.

Based on the foregoing test results, core bits 100 were fabricated from PVC bodies 24 having layers 60 and 62 fabricated from a mixture of Liquid Plasteel™ and 40 wt % MCA grain. These bits 100 were tested by drilling numerous holes in concrete blocks fabricated as described hereinabove, until bit failure. An uncoated PVC tube was also tested for comparison. The wear on the tube wall was measured at predetermined intervals of drilled holes. The results of these tests are shown in FIG. 11.

As shown, the results indicate that a tube 24 coated with layers 60 and 62 has about twice the life of an uncoated tube. The coated bit cut about 3.5 times the number of holes as the uncoated bit. However, in order to make a fair comparison of the life of the coated bit versus that of an uncoated bit, the number of holes that produce equal wear of the tube wall is shown in FIG. 11. It is evident that the life of the PVC tube may be tailored by choosing an appropriate coating thickness.

The specific parameters of the testing used to provide these results are described in Examples I and II hereinbelow.

Tubes 24 in a wide range of diameters may be utilized to fabricate core bits 100 of the present invention, as evidenced by successful testing of polymer tubes over a range of sizes. For example, bits fabricated in a range of from 2" to 12" (5 cm–30.5 cm) diameters were tested and shown to have adequate strength to withstand drilling stresses. The specific parameters and results of tests on 8" and 12" diameter cutting bits are described hereinbelow in Examples III and IV.

Figure 12:
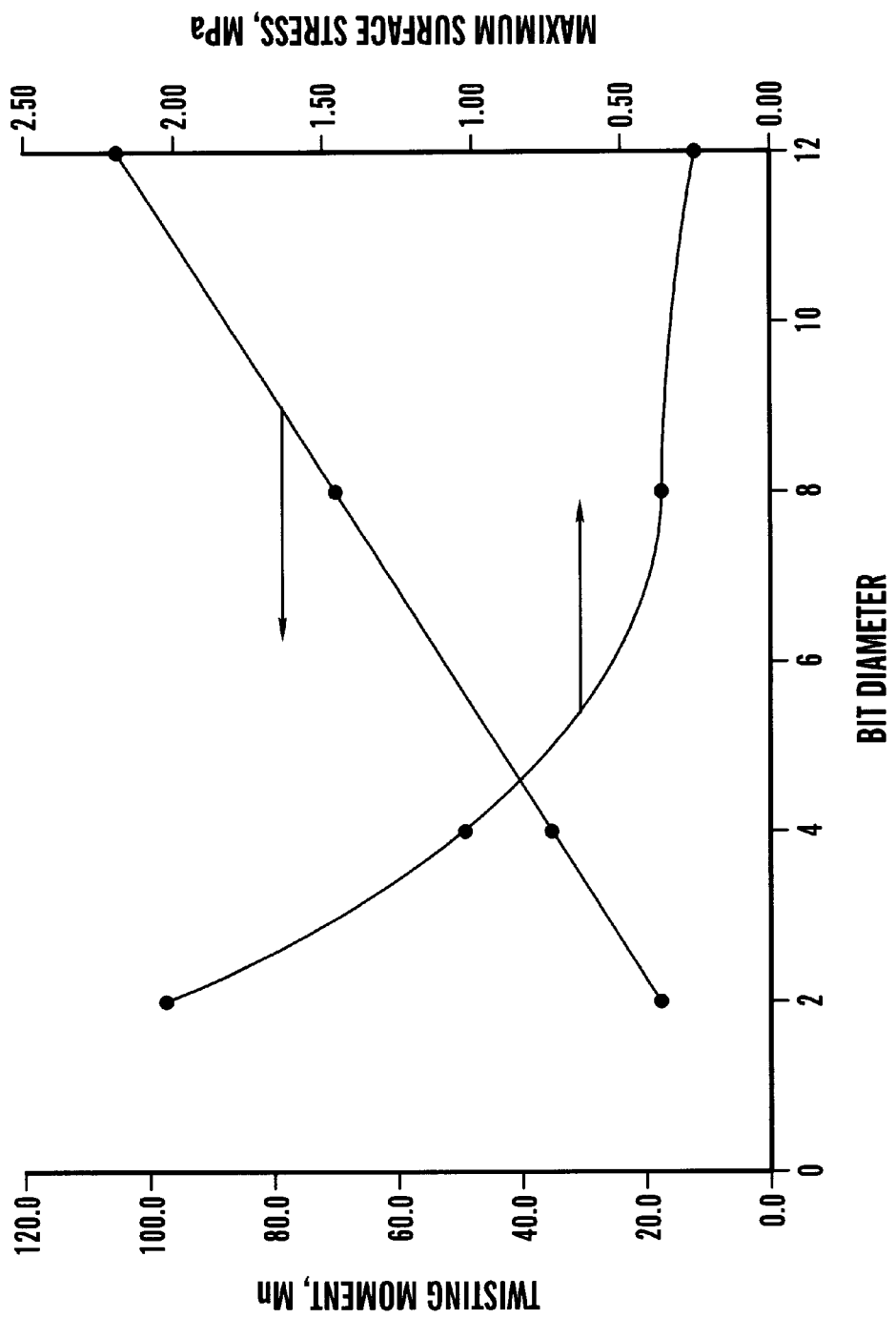
FIG. 12 is a graphical representation of the twisting moment and maximum surface stress experienced by a core bit as a function of bit diameter.

An analysis of the stresses experienced by the core bit during drilling is shown in FIG. 12. The calculated twisting moment (at the axis of the tube) and maximum stress (at the surface of the tube) is shown as a function of bit diameter. As shown, the twisting moment increases with bit size, while the maximum stress experienced by the PVC tube decreases with increasing bit diameter. Thus, core bits 100 of larger than 12 inch (30.5 cm) diameters may be utilized without increasing the probability of tube failure.

Tests also indicate that the polymer body bits 100 of the present invention operate effectively in dry drilling conditions. A PVC body bit 100 was manufactured and a high temperature adhesive used to bond the steel section with segments to the PVC tube. The bit was used for dry drilling in cinder block. Compressed air at 50 psi was injected into the core bit (in the manner similar to introduction of water for wet drilling) while drilling. A total of 10 holes each about 5 inches (13 cm) deep were drilled into the cinder block without any failure of the tube. Tube wear similar to that seen in wet drilling was observed. The use of compressed air appeared to cool the tube and facilitate the removal of swarf to minimize frictional heating.

It is further expected that the wear resistance of the polymer body 24, 224, may be increased by adding the particulate directly to the polymer prior to formation of the body. For example, approximately 20 to 40 weight % MCA grain or other wear resistant particulate may be added to the polymer. The mixture then may be utilized to fabricate a polymer body having the particulate dispersed relatively uniformly therethrough.

Moreover, while the examples of the present invention disclosed herein have been directed to core bits, the skilled artisan should recognize that disclosed techniques may be utilized in polymer bodies of various cutting implements, such as circular saw blades/cutting discs, without departing from the spirit and scope of the present invention.

The following illustrative examples are intended to demonstrate certain aspects of the present invention. It is to be understood that these examples should not be construed as limiting.

EXAMPLE I

A four inch (10 cm) diameter tube body 24 was fabricated from PVC. A metal cutting end 14 was glued to one end of the tube in the manner shown in FIG. 1. Ten cutting elements or segments 16, 1"×0.275"×0.150" (2.5 cm×0.7 cm×0.38 cm), were brazed to each bit. The segments had 30 conc., 30/40, SDA 85+ diamond. The outer surface 66 of the tube 24 was coated with a uniform 0.015" (0.04 cm) thick layer 62 of 40 wt% MCA grain and Liquid Plasteel™ as described hereinabove. The MCA grain used for this coating was 220 grit (approximately 50–70 microns). The bit was tested in steel reinforced concrete blocks of the type described hereinabove. The testing was done at 20 Amps constant drill current and 600 rpm spindle speed. A water flow rate of 3.785 liters/min (1 gal./min) was maintained during drilling. The segment wear and tube wear were monitored. The bit had a starting wall thickness of about 0.085" (0.2 cm), i.e. 0.070" (0.17 cm) tube+0.015" (0.04 cm) coating. A total of 283 holes (each 11 inches (28 cm) deep) were drilled with the coated bit before the tube wall thickness decreased to 0.050" (0.12 cm) and failed.

EXAMPLE II (CONTROL)

A second bit was fabricated in the manner described in Example I, but was not coated. The testing was performed in an identical manner as described in Example I. The starting tube wall thickness of the uncoated bit was about 0.070 inches (0.18 cm). A total of 86 holes (each 11 inches/28 cm deep) were drilled with this bit before the wall reduced to about 0.050" (0.12 cm) and failed.

EXAMPLE III

An eight inch (20 cm) core bit was made with a PVC tube body 24 having a wall thickness of 0.115" (0.3 cm) (similar to a steel body core bit). A steel cutting end 14 including a total of 16 segments brazed thereon in a manner similar to that of Example I, was bonded to the tube 24. The segments used were 2.54 cm×0.70 cm ×0.44 cm, (1"×0.275"×0.175") 30 conc., 30/50, SDA 150+ diamond grit and are standard segments used on conventional eight inch (20 cm) core bits. The 8" (20 cm) PVC bit weighed 3.9 Kg (8.6 lb.), which represented a weight savings of over 50 percent relative to a comparable conventional steel bit which weighs about 9.1 Kg (20 lb.) This bit was tested in concrete blocks of the type used in Example I. The drill current was maintained between 20 and 22 A. The drilling was conducted at a spindle speed of 400 rpm. A total of fifteen holes in conventional cinder block and twenty holes in concrete blocks of the type used in Example I were drilled. The bit cut with no difficulty. The PVC tube withstood the stresses of drilling. The bit experienced a maximum weight on bit of 340 Kg (750 lb.) indicating that it was subject to relatively aggressive stresses.

EXAMPLE IV

A 12" (30.5 cm) diameter core bit was manufactured in a similar fashion to that of Example III. The bit was made with a PVC tube 24 having a wall thickness of 0.120" (0.3 cm) (similar to a steel body core bit). A steel cutting end 14 was bonded to the PVC tube and a total of 18 segments were brazed to the steel end. The segments used were 2.5 cm×0.7 cm×0.5 cm, (1"×0.275"×0.210") with 30 conc., 30/50, SDA 100+ diamond grit. The 12" (30.5 cm) PVC bit weighed 5.9 Kg (13.2 lb.), representing a significant weight savings relative to a comparable steel-bodied bit which weighs approximately 17.2 Kg (38 lb.). The bit was tested in concrete blocks of the type used in Example I. The drilling was conducted in manual mode. The drill current was maintained between 20 and 22 Amps. The drilling was conducted at a spindle speed of 200 rpm. A total of fifteen holes in cinder block and twenty holes in the concrete block were drilled. The bit cut with no difficulty and the PVC tube withstood the stresses of drilling. The bit experienced a maximum weight on bit of 381 Kg (840 lb.) indicating that it was subject to fairly aggressive stresses.

EXAMPLE V

Four eight inch (20 cm) core bits are made with a PVC tube body 24 having a wall thickness of 0.115" (0.3 cm). A layer of 100 micron particles of MCA grain, SiC, WC and fused alumina, respectively, is embedded onto outer surface 62 of each tube 24 by heating the particulate to a temperature of about 200 degrees C. and spraying the particulate onto the surface 66 of each polymer body 24 at a velocity of approximately 100 meters/sec. The tubes are then cooled to ambient temperature so that the bodies harden and grip the particulate. A steel cutting end 14 including a total of 16 segments, is provided for each tube in the manner of Example III. The 8" (20 cm) PVC bits weigh approximately 3.6 Kg (8 lb.), representing a weight savings of over 50 percent relative to a comparable conventional steel bit weighing about 9 Kg (20 lb.). These bits provide enhanced wear resistance relative to a similar uncoated polymer-bodied bit and provide the tube with a life commensurate with the life of the segments 16 under conditions similar to those described in Example III.

EXAMPLE VI

An eight inch (20 cm) core bit is made with a PVC tube body 24 having a wall thickness of 0.115" (0.3 cm). A layer of 100 micron MCA grain particles is embedded onto outer surface 62 of tube 24 by heating the tube to a temperature of about 200 degrees C. and spraying the particulate onto the surface 66 of the polymer body 24 at a velocity of approximately 50 meters/sec. The tube is then cooled to ambient temperature so that the body hardens and grips the particulate. A steel cutting end 14 including a total of 16 segments, is provided in the manner of Example III. The 8" (20 cm) PVC bit weighs approximately 3.6 Kg (8 lb.), representing a weight savings of over 50 percent relative to a comparable conventional steel bit weighing about 9 Kg (20 lb.). This bit provides enhanced wear resistance relative to a similar uncoated polymer-bodied bit and provides the tube with a life commensurate with the life of the segments 16 under conditions similar to those described in Example III.

EXAMPLE VII

An eight inch (20 cm) core bit is made with a PVC tube body 24 having a wall thickness of 0.115" (0.3 cm). A layer of 10 micron MCA grain particles is embedded onto outer surface 62 of tube 24 by thermal spray coating in which the particulate is sprayed onto the surface 66 of the polymer body 24 at a velocity of approximately 80 meters/sec. and a temperature of about 150 degrees C. The tube is then cooled to ambient temperature so that the body hardens and grips the particulate. A steel cutting end 14 including a total of 16 segments, is provided in the manner of Example III. The 8" (20 cm) PVC bit weighs approximately 3.6 Kg (8 lb.), representing a weight savings of over 50 percent relative to a comparable conventional steel bit weighing about 9 Kg (20 lb.). A smooth coating results, with no observation of individual particles embedded in the surface. This bit provides enhanced wear resistance relative to a similar uncoated polymer-bodied bit and provides the tube with a life commensurate with the life of the segments 16 under conditions similar to those described in Example III.

EXAMPLE VIII

An 8" (20 cm) diameter core bit is manufactured in a similar fashion to that of Example III. The bit is made with a PVC tube 24 having a wall thickness of 0.120" (0.3 cm) (similar to a steel body core bit). A steel cutting end 14 is bonded to the PVC tube and a total of 16 segments are brazed to the steel end. The segments used are 1"×0.275"× 0.175" (2.5 cm×0.7 cm×0.44 cm), with 30 conc., 30/50, SDA 150+ diamond grit. A layer of 40 wt % WC and Liquid Plasteel is applied to the outer surface 66 of the polymer tube. The WC used is 220 grit (about 50–70 microns). This bit weighs 3.9 Kg (8.6 lb), representing a significant weight savings relative to a comparable steel-bodied bit which weighs approximately 9 Kg (20 lb). The bit is tested in concrete blocks of the type used in Example I. The drill current is maintained between 20 and 22 Amps. The drilling is conducted at a spindle speed of 200 rpm. The bit provides enhanced wear resistance relative to a control sample of an uncoated polymer-bodied bit.

EXAMPLE IX

An 8" (20 cm) diameter core bit is manufactured in a similar fashion to that of Example III. The bit includes a polymer matrix tube molded from a mixture of PVC and about 20 wt % SiC. The polymer matrix tube has a wall thickness of 0.120" (0.3 cm) (similar to a steel body core bit). A steel cutting end 14 is bonded to the PVC tube and a total of 16 segments are brazed to the steel end. The segments used are 1"×0.275"×0.175" (2.5 cm×0.7 cm×0.44 cm), with 30 conc., 30/50, SDA 150+ diamond grit. The SiC used is 220 grit (about 50–70 microns). This bit weighs about 3.6 Kg (8 lb), representing a significant weight savings relative to a comparable steel-bodied bit which weighs approximately 9 Kg (20 lb). The bit is tested in concrete blocks of the type used in Example I. The drill current is maintained between 20 and 22 Amps. The drilling is conducted at a spindle speed of 200 rpm. The bit provides enhanced wear resistance relative to a control sample of a uncoated polymer-bodied bit.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A lightweight cutting tool comprising:
 a cutter of substantially cylindrical configuration including an array of cutting elements, said cutter having a cutting end and a coupling end;
 a shaft of substantially cylindrical configuration fabricated from a non-metallic composite material, said shaft having a cutter engagement end and a drill engagement end;
 said cutter and said shaft adapted for concentric, end to end engagement with one another wherein said coupling end is substantially rigidly engaged with said cutter engagement end;
 said drill engagement end being adapted for operative engagement with a driver for rotation of said cutting tool about the concentric axis.

2. The tool of claim 1, wherein said shaft is fabricated from a reinforced polymer including a polymer mixed with a wear resistant material.

3. The tool of claim 2, wherein the wear resistant material is selected from the group consisting of metals and ceramics in the form of particulates, whiskers, chopped fibers and filaments, and combinations thereof.

4. A lightweight tool adapted to cut a workpiece, the tool comprising:
 a cutter portion including an array of cutting elements, said cutter portion having a cutting end and a coupling end;
 a body fabricated from a non-metallic composite material, said body having a cutter engagement portion and a driver engagement portion;
 said cutter portion and said body adapted for rigid concentric engagement with one another;
 said driver engagement portion being adapted for operative engagement with a driver for rotation of said cutting tool about the concentric axis.

5. The tool of claim 4, wherein said cutter portion is of substantially cylindrical configuration, and said body is a shaft of substantially cylindrical configuration fabricated from a non-metallic composite material;
 said cutter and said shaft being adapted for concentric, end to end engagement with one another wherein said coupling end is substantially rigidly engaged with said cutter engagement portion;
 said driver engagement portion being a drill engagement end adapted for operative engagement with a drill for rotation of said cutting tool about the concentric axis.

6. The tool of claim 4, further comprising a layer of wear resistant particulate disposed on a surface of the body.

7. The tool of claim 6, wherein said wear resistant particulate is selected from the group consisting of ceramics, metals and metal alloys, cermets, and combinations thereof.

8. The tool of claim 7, wherein said wear resistant particulate is selected from the group consisting of alumina, silicon carbide, silicon nitride, silica, tungsten carbide, boron nitride, sol-gel alumina, alumina-zirconia, iron, nickel, Co, steel, bronze, Co-WC, and combinations thereof.

9. The tool of claim 6, wherein said wear resistant layer is bonded to the polymer body with an adhesive.

10. The tool of claim 6, wherein said particulate is embedded into the surface of the polymer body.

11. The tool of claim 6, wherein said particulate is embedded by heating the particulate to 100 to 2000° C.; and spraying the heated particulate onto the surface of the polymer body at a velocity of 10 to 500 meters/sec wherein the heated particulate softens the polymer and embeds into the surface.

12. The tool of claim 10, wherein said particulate is embedded by:
 heating the polymer body to a temperature effective to soften the surface of the polymer body without exceeding the glass transition temperature of the polymer body, wherein the surface of the polymer body is softened;
 spraying the wear resistant particulate onto the surface of the polymer body at a velocity effective to embed the particulate to a depth of more than 50% of the particle diameter; and
 cooling the polymer body wherein the body hardens and grips the particulate.

13. The tool of claim 6, wherein said particulate is applied to the polymer body by:
 thermal spraying, wherein the particles are coated onto the surface.

14. The tool of claim 11, wherein said particulate is heated to a temperature between the glass transition temperature of the polymer body and about 0.5 of the melting point of the particulate.

15. The tool of claim 12, wherein said polymer body is heated to a temperature within a range of 0.5 and 1.0 times the glass transition temperature of the polymer body.

* * * * *